(12) United States Patent
Al-Hallaj et al.

(10) Patent No.: US 11,749,847 B2
(45) Date of Patent: Sep. 5, 2023

(54) FAST CHARGING BATTERIES AT LOW TEMPERATURES WITH BATTERY PACK PREHEATING

(71) Applicant: ALL CELL TECHNOLOGIES, LLC, Broadview, IL (US)

(72) Inventors: Said Al-Hallaj, Chicago, IL (US); Mohamad M. Salameh, Torrance, CA (US); Samuel T. Plunkett, Chicago, IL (US); Chengxiu Chen, Chicago, IL (US); Stoyan Stoyanov, Chicago, IL (US)

(73) Assignee: BEAM GLOBAL, San Diego, CA (US)

( * ) Notice: Subject to any disclaimer, the term of this patent is extended or adjusted under 35 U.S.C. 154(b) by 0 days.

(21) Appl. No.: 17/675,112

(22) Filed: Feb. 18, 2022

(65) Prior Publication Data
US 2022/0271352 A1 Aug. 25, 2022

Related U.S. Application Data

(60) Provisional application No. 63/152,611, filed on Feb. 23, 2021.

(51) Int. Cl.
*H01M 10/44* (2006.01)
*H01M 10/48* (2006.01)
(Continued)

(52) U.S. Cl.
CPC ....... *H01M 10/443* (2013.01); *H01M 10/486* (2013.01); *H01M 10/615* (2015.04); *H01M 10/6571* (2015.04)

(58) Field of Classification Search
CPC ............ H01M 10/443; H01M 10/446; H01M 10/448; H01M 10/615; H01M 10/617;
(Continued)

(56) References Cited

U.S. PATENT DOCUMENTS 5,362,942 A 11/1994 Vanderslice, Jr. et al.
6,111,389 A * 8/2000 Aranovich ............ H01M 10/44
320/160

(Continued)

OTHER PUBLICATIONS

U.S. Appl. No. 10/164,301, filed Dec. 25, 2018, Al-Hallaj et al.
(Continued)

*Primary Examiner* — Raymond Alejandro
(74) *Attorney, Agent, or Firm* — Pauley Erickson & Swanson

(57) ABSTRACT

A method and apparatus for charging a battery pack including a plurality of electrochemical cells distributed within a thermal management composite matrix, including a phase change material. The method operates upon determining that a battery pack temperature and/or voltage measurement is below a predetermined minimum threshold. The pack temperature and/or the voltage measurement is raised to the predetermined minimum threshold, such as by applying a low current rate, and then the charging rate is increased upon reaching the predetermined minimum threshold. The increased charging rate is further selected based upon a thermal state of charge of the thermal management composite matrix.

17 Claims, 5 Drawing Sheets

(51) Int. Cl.
*H01M 10/6571* (2014.01)
*H01M 10/615* (2014.01)

(58) Field of Classification Search
CPC ............ H01M 10/62; H01M 10/6571; H01M 10/657; H01M 10/654; H01M 10/655; H01M 10/486; H01M 10/482
See application file for complete search history.

(56) References Cited

U.S. PATENT DOCUMENTS

| | | | |
|---|---|---|---|
| 6,468,689 B1 | 10/2002 | Hallaj et al. | |
| 6,942,944 B2 | 9/2005 | Al-Hallaj et al. | |
| 9,742,047 B2 | 8/2017 | Ebner et al. | |
| 2004/0075417 A1* | 4/2004 | Aradachi | H02J 7/007192 |
| | | | 320/150 |
| 2015/0104681 A1 | 4/2015 | Wang et al. | |
| 2016/0336623 A1 | 11/2016 | Nayar et al. | |
| 2019/0252742 A1 | 8/2019 | Liu et al. | |
| 2020/0235446 A1 | 7/2020 | Al-Hallaj et al. | |
| 2021/0083488 A1* | 3/2021 | Hirose | H02J 7/36 |
| 2021/0143661 A1* | 5/2021 | Xu | H01M 10/443 |

OTHER PUBLICATIONS

ISA/US, English language verison of the International Search Report, Form PCT/ISA/210, for International Application PCT/US2022/017280, dated Feb. 22, 2022 (06 pages).

ISA/US, Form PCT/ISA/237, Written Opinion of the International Searching Authority, for International Application PCT/US2022/017280, dated Feb. 22, 2022 (06 pages).

* cited by examiner

FAST CHARGING BATTERIES AT LOW TEMPERATURES WITH BATTERY PACK PREHEATING

CROSS REFERENCE TO RELATED APPLICATION

This application claims the benefit of U.S. Provisional Application Ser. No. 63/152,611, filed on 23 Feb. 2021. The provisional application is hereby incorporated by reference herein in its entirety and is made a part hereof, including but not limited to those portions which specifically appear hereinafter.

FIELD OF THE INVENTION

This invention relates generally to rechargeable battery packs and, more particularly, to an apparatus, method, and control system for faster or otherwise improved charging of batteries, particularly at low battery temperatures.

BACKGROUND OF THE INVENTION

In recent years, lithium-ion (Li-ion) battery packs have been the dominant energy storage system (ESS) in electrified transportation applications such as material handling, robotics, and electric vertical takeoff and landing aircraft. These applications prefer a high-energy-density and lightweight ESS owing to size and weight limitations. However, they are often equipped with an oversized battery pack to mitigate the long down-time due to the low charging rates (<1 C) of high-energy-density Li-ion batteries. Fast charging is a potential solution to create a "filling a tank" experience that has recently drawn tremendous interest from researchers and the industry.

Limited research has been conducted on techniques that can be implemented to improve fast-charging performance at a pack level. Research has shown that techniques such as temperature control and dynamic charging currents can lead to improved performance and aging, and optimization of these features in a commercial battery pack will require the integration of temperature and current/voltage control into a sophisticated battery management system.

Controlling temperature during fast charging of Li-ion cells can play a significant role in improving the performance and cycle life of batteries. There is a continuing need for improved battery systems, and battery charging technology.

SUMMARY OF THE INVENTION

A general object of the invention is to provide improved charging for battery systems or battery packs. A more specific objective of the invention is to overcome one or more of the problems described above.

The general object of the invention can be attained, at least in part, through a method for charging a battery pack including a plurality of electrochemical cells distributed within a thermal management composite matrix, such as a phase change composite (PCC). The method includes: determining that a voltage measurement of the battery pack is below a predetermined minimum threshold; raising the voltage measurement to the predetermined minimum threshold. The method alternatively or additionally includes: determining that a pack temperature of the battery pack is below a predetermined minimum threshold; raising the pack temperature to the predetermined minimum threshold. The method further includes increasing a charging rate upon reaching the predetermined minimum threshold for the pack temperature and/or the voltage measurement. The charging rate can be determined as a function of a thermal state of charge (TSoC) of the thermal management composite matrix.

In embodiments of this invention, the predetermined minimum threshold for the pack temperature is a predetermined minimum charging temperature. The method can be implemented by heating the battery pack by directing a warming electric current through the thermal management composite matrix until reaching the predetermined minimum charging temperature. The warming current can be generated from the battery pack or an external charger, such as where there is insufficient voltage in the battery pack.

In embodiments of this invention, the method includes a charging the battery pack at a low temperature charging rate (e.g., <1C) during the heating.

In embodiments of this invention, the predetermined minimum threshold for the voltage measurement is a minimum charge for dynamic and/or fast charging. The method can be implemented by raising the voltage measurement to the minimum charge at a first, lower charging rate, and increasing to a second, higher (e.g., "fast" and/or "dynamic") charging rate upon reaching the minimum charge.

In embodiments of this invention the second, higher charging rate is a first dynamic charge rate that occurs when a thermal state of charge (TSoC) value of the thermal management composite matrix is below a first predetermined value. Alternatively, the second, higher charging rate is a second dynamic charge rate that is lower than the first dynamic charge rate when the thermal state of charge (TSoC) value of the thermal management composite matrix is above the first predetermined value. Yet as another alternative, the second, higher charging rate can be a third dynamic charge rate that is lower than the second dynamic charge rate when the thermal state of charge value of the thermal management composite matrix is above a second predetermined value that is higher than the first predetermined value. Various levels of charging rates corresponding to predetermined TSoC levels can be implemented, depending on need.

The invention further includes a method for charging a battery pack including a plurality of electrochemical cells distributed within a thermal management composite matrix, by: determining a pack temperature of the battery pack is below a predetermined minimum charging temperature (e.g., 40° C.-45° C.); and heating the battery pack by directing a warming electric current through the thermal management composite matrix until reaching the predetermined minimum charging temperature. Again the warming electric current can be generated from at least one cell of the plurality of electrochemical cells or an external source (e.g., the battery charger).

The heating method can include simultaneously heating the battery pack and charging the battery pack at a low temperature dynamic charging rate, such as when the pack temperature is between a predetermined low temperature (e.g., 0° C.-10° C.) and the predetermined minimum charging temperature. An exemplary low temperature dynamic charging is less than 1C or one hour charging, and an optimum temperature dynamic charging is higher than 1C or one-hour charging. Dynamic charging can be commenced upon reaching the predetermined minimum charging temperature.

The invention further includes battery pack including a plurality of electrochemical cells, a thermal management composite matrix disposed around the electrochemical cell elements, and a heating element comprising two electrical contacts, each disposed on one of opposing sides of the thermal management composite matrix. The heating element is configured to direct the warming electric current between the electrical contacts and through the thermal management composite matrix until reaching a predetermined minimum charging temperature. The heating element is preferably electrically connected to at least one of the plurality of electrochemical cells.

A temperature sensor can be placed on or within the thermal management composite matrix, which can include a plurality of openings containing a supply of phase change material.

Other objects and advantages will be apparent to those skilled in the art from the following detailed description taken in conjunction with the appended claims and drawings.

DESCRIPTION OF THE INVENTION

The present invention includes devices, methods, and control systems for improved charging of battery packs, particularly at colder temperatures. Embodiments of the invention use preheating of the cold battery pack to support fast and/or dynamic charging upon reaching a suitable temperature, such as between 35° C.-50°, and more desirably 40° C.-45° C. As used herein, "fast" generally refers to increased charging rates, and "dynamic" generally refers to adjustable or changeable charging rates depending on real-time battery pack characteristics. Embodiments of this invention increase a temperature of the pack prior to charging, to avoid charging the cells at low temperatures. The preheating of this invention can affect cell ageing and safety, as well as improve a speed of recharging.

Figure 1:
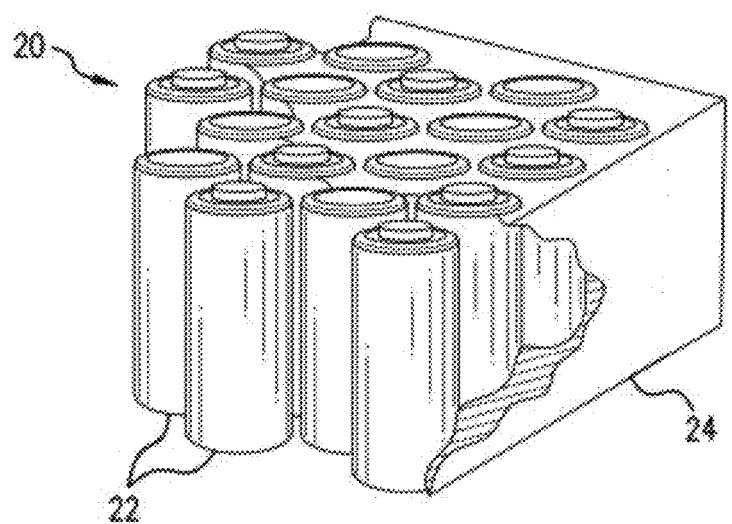
FIG. 1 shows an exemplary battery pack, according to one embodiment of this invention.

FIG. 1 shows a battery pack cell array 20 according to one embodiment of this invention. Electrochemical cells 22 are contained by, and at least partially surrounded by, a composite matrix structure 24. The structure 24 can be any suitable material. For example, the structure 24 can be a lattice member formed of various screen or foam materials such as graphite foam or metal foams, such as aluminum foam, and particularly open-celled forms of such foams, for example, where the porous material includes or contains a phase change material, such as microencapsulated wax, for temperature regulation during normal battery use.

In embodiments of this invention, the matrix supporting the array of battery cells is preheated, thus also heating the cells for improved charging. Direct resistance (i.e., Joule) heating can be used, whereby a warming electric current (e.g., 150-200 A) is passed through the matrix material. The electrical resistance of the matrix is thus used to turn the matrix into a heating element.

Figure 2:
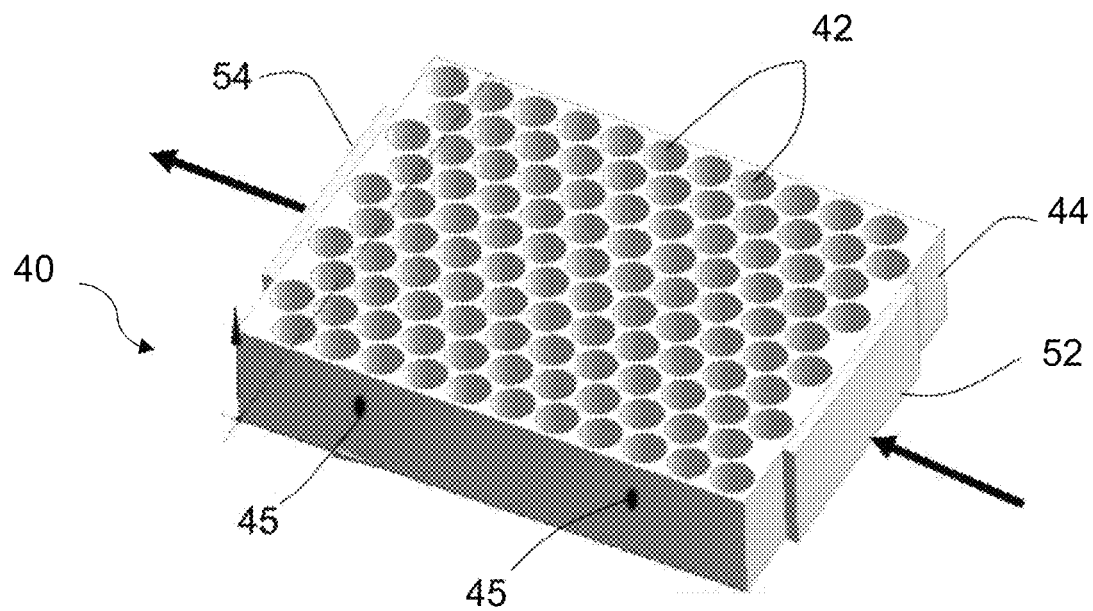
FIG. 2 shows a heating system applied to a battery pack thermal management matrix, according to one embodiment of this invention.

FIG. 2 shows a simplified battery pack 40 according to one embodiment of this invention. The battery pack 40 includes a plurality of electrochemical cells 42, surrounded by a thermal management composite matrix 44. A heating element 50 includes two electrical contacts 52 and 54, each disposed on one of opposing sides of the thermal management composite matrix 44. In embodiments of this invention one or more temperature sensors 45 can be placed on or within the matrix to monitor the temperature and preheating.

Figure 3:
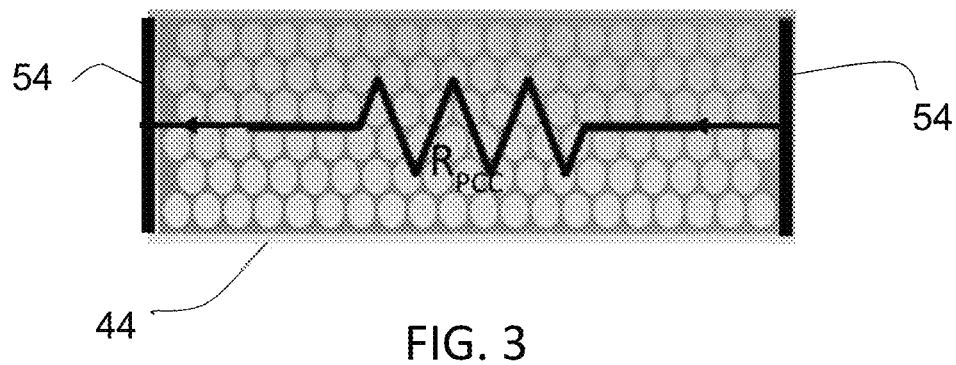
FIG. 3 illustrates the heating according to one embodiment of this invention.
Figure 4:
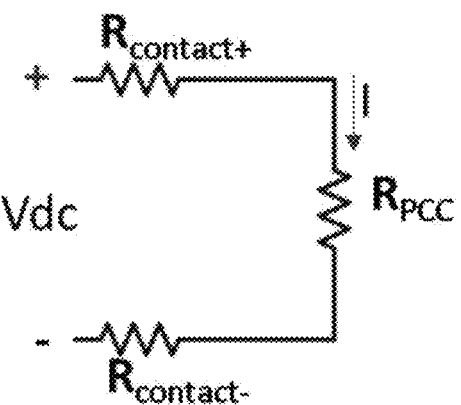
FIG. 4 is a general circuit diagram of the heating circuit according to one embodiment of this invention.

As illustrated in FIGS. 3 and 4, the heating element 50 is desirably configured to direct a warming electric current (represented by black arrows in FIGS. 2 and 3) between the electrical contacts 52 and 54 and through the thermal management composite matrix 44 (PCC) until reaching a predetermined minimum charging temperature. As an example, a 150-200 A current can be used to raise a PCC temperature approximately 20-25° in as little as five minutes. The heating element 50 can be electrically connected to one or more of the plurality of electrochemical cells 42, and/or to an additional current source, such as the battery charger. The further current source can be used, for example, if the power in the cells 42 is too low to perform the preheating.

Figure 5:
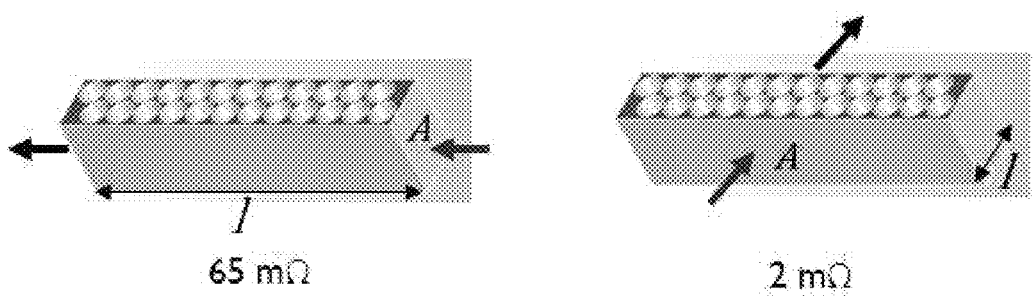
FIG. 5 shows comparative heating system configurations according to embodiments of this invention.

The size, shape, and materials of the matrix and/or the electrical contacts can impact direct resistance heating, and can thus vary depending on need. Suitable materials for the electrical contacts can include, for example, silver, nichrome, Kanthal®, cupronickel, and/or platinum materials. In addition, the pack/matrix dimension (e.g., aspect ratio) and the placement of the contacts can impact resistance. For example, contacts on a larger dimension of the matrix generally provide lower resistance and lower heat generation compared to the smaller dimension, requiring more power, as represented in FIG. 5. The larger dimension also provides an increased surface area for convective cooling.

Figure 6:
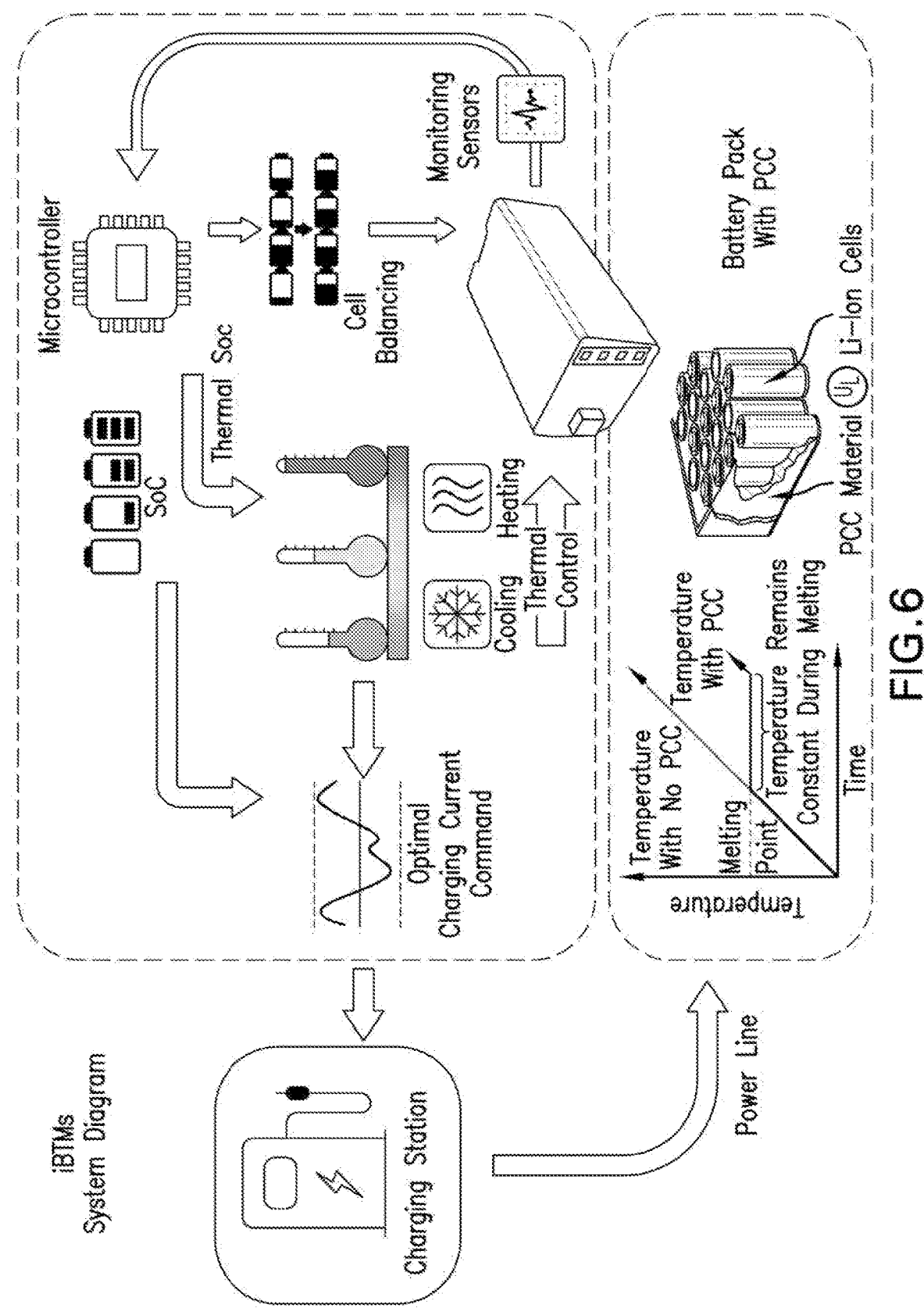
FIG. 6 illustrates an intelligent battery thermal management system (iBTMS) framework according to one embodiment of this invention.

The development of a fast-charge-capable Li-ion battery pack is a system-level concern. All parts in the system, including the Li-ion battery cell, battery pack, battery management system, and any thermal management system (TMS), need to be optimized and carefully integrated. FIG. 6 representatively illustrates an intelligent battery TMS (iBTMS) framework to analyze, control, and optimize fast-charging-capable Li-ion battery packs. The temperature of the battery pack will be increased before the charging step to improve the electrochemical kinetics during charge. The temperatures will be limited by choosing the suitable wax (or other PCM) with the desired phase change temperature. The iBTMS would desirably also be able to communicate with the charger based on the electrical and thermal status of the battery pack.

As shown in FIG. 6, a PCC matrix material surrounds Li-ion cells to form a battery pack. A monitoring controller is used to monitor the temperature, as well as the state of charge of the PCC. The controller disallows the charging from the charging station if the temperature of the battery is below a predetermined value, and preheats the battery PCC according to this invention to an optimal predetermined temperature to then allow charging from the charging station. The controller can desirably further operate the TMS to cool the battery and/or otherwise safely limit battery use during overheating.

A phase change composite-based TMS according to embodiments of this invention has a high heat absorption capability that can be exploited only as long as the PCC has unmelted wax. Beyond this point, the temperature of the battery pack will increase at a much faster rate, which exposes the pack to high temperatures that can potentially affect long-term reliability and performance. Therefore, the PCC needs to be extensively tested and characterized before fast-charging algorithms can be implemented. Moreover, the control protocols need to monitor the electrical and thermal status of the battery pack to adjust the charging current command, maintain optimal pack temperature necessary to enable optimized lithiation kinetics and mass transport, and prevent the pack from reaching high temperatures that cause rapid aging and safety concern.

The invention further includes a method for charging a battery pack. The method includes determining that a current pack temperature of the battery pack to be charged is below a predetermined minimum charging temperature, namely a desired or optimum temperature for charging. The method then includes heating the battery pack by directing a warming electric current through the thermal management composite matrix until reaching the predetermined minimum charging temperature. As discussed above, the warming electric current can be generated by at least one cell of the plurality of electrochemical cells, and/or an outside source where an insufficient voltage response from the plurality of electrochemical cells. The outside source can be another battery, or a current from the battery charging station, which may be reduced as needed. Normal dynamic charging can be resumed upon reaching the predetermined minimum charging temperature.

In embodiments of this invention, the method includes simultaneously heating the battery pack and charging the battery pack at a low temperature dynamic charging when the pack temperature is between a predetermined low temperature and the predetermined minimum charging temperature. As an example, the low temperature dynamic charging is, for example, about 50%-75% reduced, such as less than 1C, or one hour, charging, whereas an optimum temperature dynamic charging is higher than 1C or one-hour charging.

Figure 7:
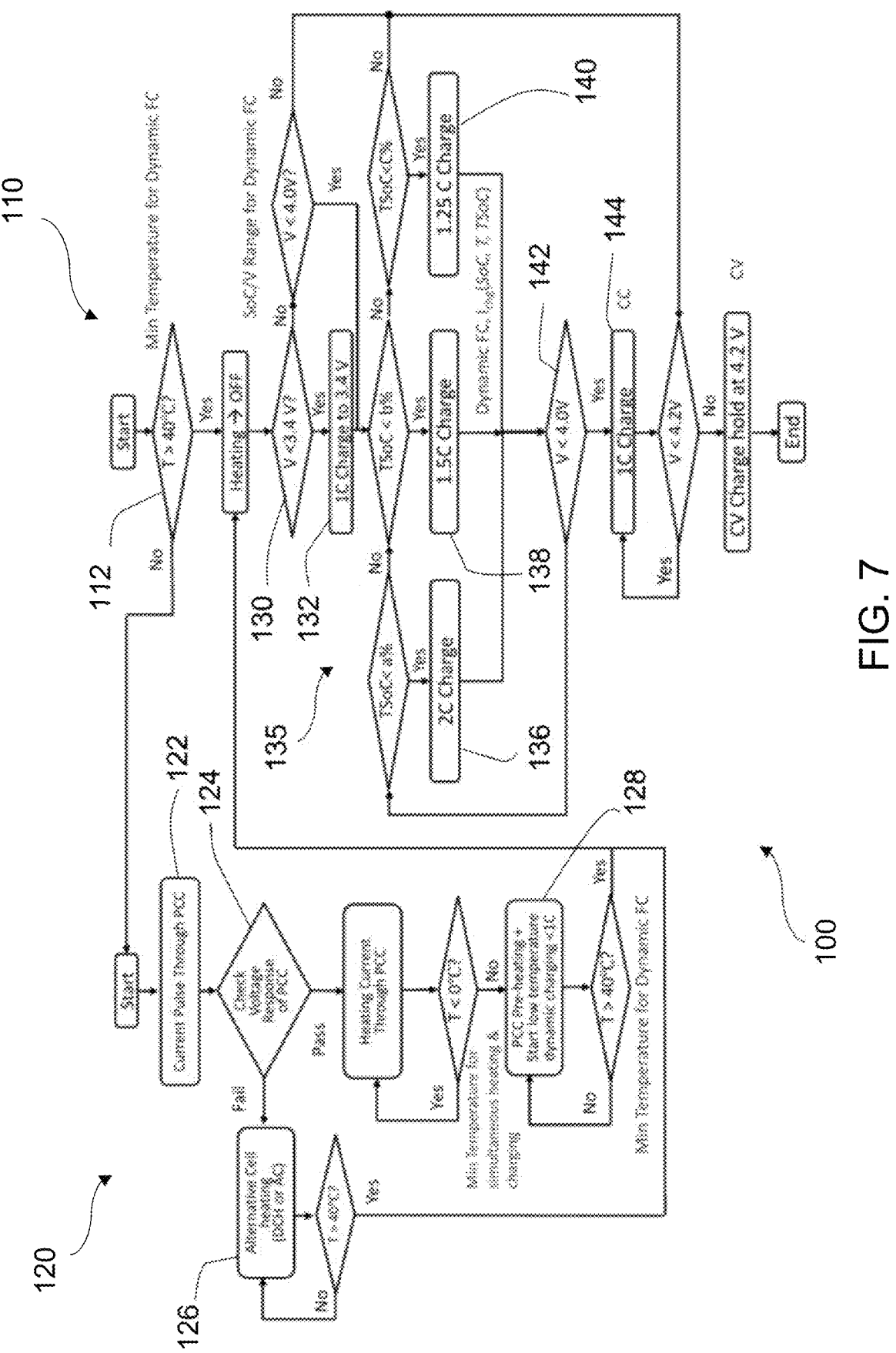
FIG. 7 is a flow diagram of the methods according to embodiment of this invention.

FIG. 7 illustrates an operation method 100 according to one embodiment of the invention, such as implemented using a control device and/or algorithm executed by a data processor (e.g., the iBTMS of FIG. 6). Values such as temperature, voltage, and/or charging rate illustrated in FIG. 7 are exemplary values for illustration purposes, and are not limiting to the invention. FIG. 7 also shows an exemplary charging algorithm 110, supplemented with a preheating algorithm 120, according to embodiments of this invention. The charging algorithm 110 and the preheating algorithm 120 can also be implemented separately in systems, depending on need.

Referring to FIG. 7, when the controller determines (step 112) that the temperature of the battery is less than a predetermined minimum threshold (e.g., 40° C.), such as the identified optimum dynamic charging temperature, the preheating process 120 begins. A voltage is applied to the matrix of the battery pack in step 122. The voltage response of the battery composite is checked in step 124, to determine whether an outside source 126 is needed for the preheating. In the illustrated embodiment, the heating continues until the temperature is determined to be above 0° C., which is the identified minimum temperature that allows for simultaneous heating and charging in this battery installation. A low temperature dynamic charging, such as less than 1C or one hour charging, is started in step 128 and continued until reaching the minimum temperature needed for dynamic charging according to charging algorithm 110.

Charging algorithm 110 shows a dynamic charge for reaching a full or desired charge (e.g., 4.2V). The method can be used with or without the preheating steps. The charging algorithm 110 considers the continually measured battery voltage and the corresponding thermal state of charge (TSoC) of the phase change composite (identified as predetermined thermal state of charge percentages), to adjust the charge rate to reach the desired full charge. For example, as the charging hits a predetermined amount of the full charge, shown in FIG. 7 as 3.4V, the controller determines the thermal state of charge of the phase change material to dynamically set the charge rate (e.g., 2C, 1.5C, or 1.25C) for the continuing charging to avoid overheating.

Referring to FIG. 7, once the heating of method 120 is completed, or otherwise not need, the controller determines 130 a voltage of the battery pack. If the voltage is less than a predetermined minimum threshold for dynamic charging (e.g., 3.4V), then the battery pack is charged (step 132) at a first, lower charging rate (e.g., 1C) until reaching the minimum charge (3.4.V). Dynamic charging 135 can be implemented upon reaching the minimum charge to quickly approach the full or desired charge. The dynamic charging in this embodiment takes into account the thermal state of charge (i.e., how much thermal energy can presently be absorbed) of the battery pack's thermal management system, to determine the level of charging that can be used.

In FIG. 7, three predetermined thermal state of charge (TSoC) thresholds (<a %, <b %, <c %) are tied to three corresponding current charging rates (2C, 1.5C, 1.25C). A higher charging rate can be implemented for faster charging is there is more PCM material available to absorb the excess thermal energy from the fast charging. For example, if a is 25% TSoC, b is 50% TSoC, and c is 75% TSoC, then 2C charging 136 is used if the battery pack's thermal management system is less that 25%, 1.5C charging 138 can be used for a TSoC between 25-50%, and 1.25C charging 140 can be used between 50-75% TSoC. 1C charging or less may be needed above 75%, or no charging may be allowed due to potential overheating at particular TSoC levels. Preferably, the charging rate continues until approaching (step 142) the end charge (e.g., 4.0V), and then a lower charging rate (step 144) can be used to reach full charge (e.g., 4.2V). However, the charging rate can also be switched if the TSoC drops too much/quickly.

Figure 8:
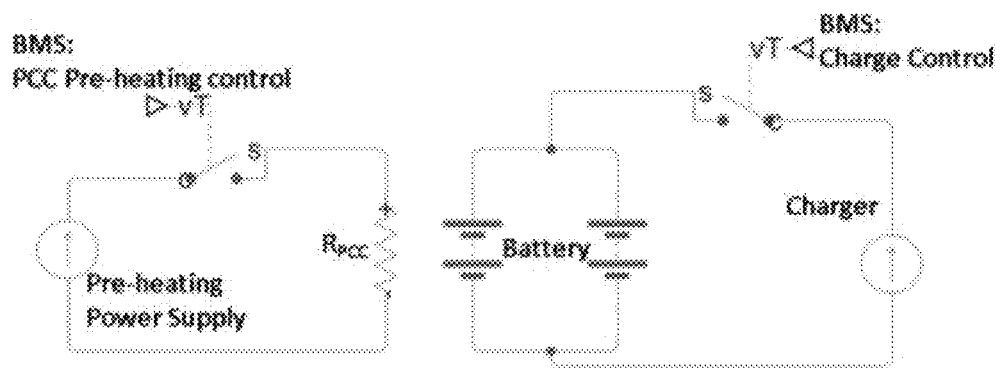
FIGS. 8 and 9 each show a general circuit diagram according to embodiments of this invention.
Figure 9:
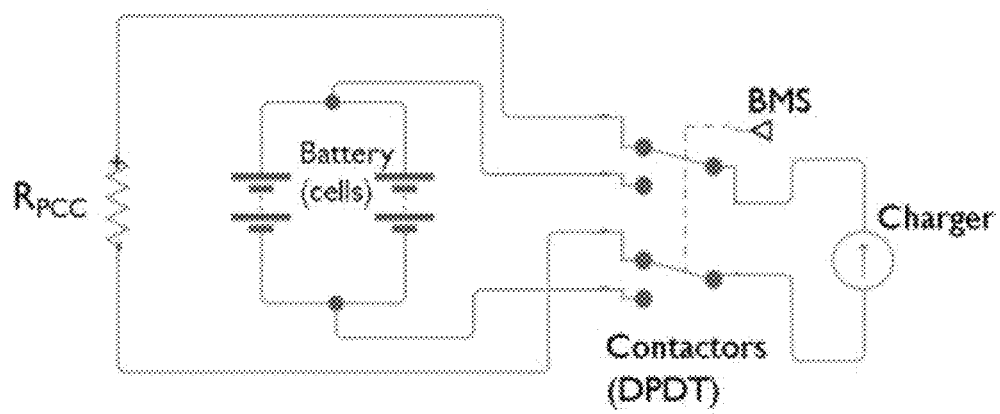

FIG. 8 shows an operation control circuit according to an exemplary embodiment of this invention for simultaneous pre-heating and charging. A battery management system (BMS) controls a current flow from a charger to the battery pack (PCC). The BMS also controls a pre-heating current to and through ($R_{PCC}$) the battery pack, such as from the battery cells or a different pre-heating power supply. FIG. 9 shows an exemplary operational control circuit for alternating pre-heating and charging. The BMS can switch the charger between the battery and the pre-heating mechanism ($R_{PCC}$).

Thus, the invention provides a method and system for dynamically charging and/or preheating a battery to improve battery charging. The invention improves fast-charging and/or dynamic charging capabilities, especially when at lower temperatures.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for charging a battery pack including a plurality of electrochemical cells distributed within a thermal management composite matrix, the method comprising:
   determining that a pack temperature and/or a voltage measurement of the battery pack is below a predetermined minimum threshold;
   raising the pack temperature and/or the voltage measurement to the predetermined minimum threshold;
   increasing a charging rate upon reaching the predetermined minimum threshold for the pack temperature and/or the voltage measurement; and
   determining the charging rate as a function of a thermal state of charge of the thermal management composite matrix.

2. The method of claim 1, wherein the predetermined minimum threshold for the pack temperature is a predetermined minimum charging temperature, and further comprising:
   heating the battery pack by directing a warming electric current through the thermal management composite matrix until reaching the predetermined minimum charging temperature.

3. The method of claim 2, further comprising:
   charging the battery pack at a low temperature charging rate during the heating.

4. The method of claim 2, further comprising generating the warming electric current from at least one cell of the plurality of electrochemical cells.

5. The method of claim 4, further comprising:
   determining an insufficient voltage response from the plurality of electrochemical cells; and
   generating the warming electric current from a current source external of the battery pack.

6. The method of claim 1, wherein the predetermined minimum threshold for the voltage measurement is a minimum charge for dynamic fast charging.

7. The method of claim 6, further comprising:
   raising the voltage measurement to the minimum charge at a first, lower charging rate; and
   increasing to a second, higher charging rate upon reaching the minimum charge.

8. The method of claim 7, further comprising:
   increasing the second, higher charging rate to a first dynamic charge rate when a thermal state of charge value of the thermal management composite matrix is below a first predetermined value; or
   increasing the second, higher charging rate to a second dynamic charge rate that is lower than the first dynamic charge rate when the thermal state of charge value of the thermal management composite matrix is above the first predetermined value.

9. The method of claim 7, further comprising:
   increasing the second, higher charging rate to a third dynamic charge rate that is lower than the second dynamic charge rate when the thermal state of charge value of the thermal management composite matrix is above a second predetermined value that is higher than the first predetermined value.

10. The method of claim 1, further comprising simultaneously heating the battery pack and charging the battery pack at a low temperature dynamic charging rate when the pack temperature is between a predetermined low temperature and the predetermined minimum threshold.

11. The method of claim 10, wherein the low temperature dynamic charging is less than 1C or one hour charging.

12. The method of claim 11, wherein an optimum temperature dynamic charging is higher than 1C or one-hour charging.

13. The method of claim 10, further comprising resuming normal dynamic charging upon reaching a predetermined minimum charging temperature.

14. The method of claim 1, further comprising providing the battery pack with a heating element comprising two electrical contacts, each disposed on one of opposing sides of the thermal management composite matrix.

15. The method of claim 14, further comprising directing a warming electric current between the electrical contacts and through the thermal management composite matrix until reaching a predetermined minimum charging temperature.

16. The method of claim 14, wherein the heating element is electrically connected to the plurality of electrochemical cells.

17. The method of claim 14, further comprising monitoring the pack temperature with a temperature sensor placed on or within the thermal management composite matrix, and the thermal management composite matrix includes a plurality of openings containing a supply of phase change material.

* * * * *